(12) United States Patent
Ohta et al.

(10) Patent No.: US 11,813,940 B2
(45) Date of Patent: Nov. 14, 2023

(54) DISPLAY DEVICE

(71) Applicant: MITSUBISHI JIDOSHA KOGYO KABUSHIKI KAISHA, Tokyo (JP)

(72) Inventors: Jinichi Ohta, Tokyo (JP); Yuichi Kamei, Tokyo (JP); Takayuki Okuji, Tokyo (JP); Toyohito Hirano, Tokyo (JP); Reoto Ueda, Tokyo (JP); Akinori Kawasaki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 17/598,709

(22) PCT Filed: Jan. 23, 2020

(86) PCT No.: PCT/JP2020/002259
§ 371 (c)(1),
(2) Date: Sep. 27, 2021

(87) PCT Pub. No.: WO2020/195070
PCT Pub. Date: Oct. 1, 2020

(65) Prior Publication Data
US 2022/0144090 A1 May 12, 2022

(30) Foreign Application Priority Data

Mar. 28, 2019 (JP) .................................. 2019-063549
May 28, 2019 (JP) .................................. 2019-099168

(51) Int. Cl.
*B60K 35/00* (2006.01)
*G09G 5/38* (2006.01)
*B60K 6/20* (2007.10)

(52) U.S. Cl.
CPC ............... *B60K 35/00* (2013.01); *B60K 6/20* (2013.01); *G09G 5/38* (2013.01);
(Continued)

(58) Field of Classification Search
CPC .... B60K 35/00; B60K 6/20; B60K 2370/156; B60K 2370/167; B60K 2370/154; B60K 2370/172; G09G 5/38
See application file for complete search history.

(56) References Cited

U.S. PATENT DOCUMENTS 10,604,159 B2 * 3/2020 Ishibashi ................ B60K 6/445
11,370,301 B2 * 6/2022 Skelly ...................... G01P 7/00
(Continued)

FOREIGN PATENT DOCUMENTS

CN        108944402 A    12/2018
EP          2543965 A2 *   1/2013 ......... B60R 16/0236
(Continued)

OTHER PUBLICATIONS

International Search Report for PCT/JP2020/002259 dated Mar. 31, 2020.
(Continued)

*Primary Examiner* — Chico A Foxx
(74) *Attorney, Agent, or Firm* — Birch, Stewart, Kolasch & Birch, LLP

(57) ABSTRACT

A display device (40) that displays information of a plurality of variables that reflect a state of a vehicle, the display device (40) including: a first meter image (41) including a first scale displaying (42) part that displays a scale of a first variable included in the plurality of variables and an indicating part (43) that indicates the first variable that varies with the state of the vehicle and rotating the first scale displaying part (42) in accordance with variation of the first variable, fixing the position of the indicating part (43); and a second meter image (44) including a second scale displaying part (45) that displays a scale of a second variable included in the plurality of variables and a displaying part (46) that displays the second variable that varies with the
(Continued)

state of the vehicle, wherein the first meter image (41) and the second meter image (44) are adjacent to each other.

7 Claims, 9 Drawing Sheets

(52) U.S. Cl.
CPC .. *B60K 2370/154* (2019.05); *B60K 2370/156* (2019.05); *B60K 2370/167* (2019.05); *B60K 2370/172* (2019.05)

(56) References Cited

U.S. PATENT DOCUMENTS

| | | | | |
|---|---|---|---|---|
| 2003/0164756 A1* | 9/2003 | Hayashi | ................. | B60K 35/00 340/439 |
| 2003/0164757 A1* | 9/2003 | Hayashi | ............. | B60R 16/0232 340/441 |
| 2006/0174814 A1* | 8/2006 | Harada | .................. | B60K 37/02 116/62.1 |
| 2007/0171142 A1* | 7/2007 | Ikarashi | ................. | B60K 35/00 33/264 |
| 2009/0125173 A1* | 5/2009 | Komatsu | ................. | B60L 50/16 701/99 |
| 2009/0174538 A1* | 7/2009 | Shibata | ................... | B60L 50/16 340/438 |
| 2009/0322503 A1 | 12/2009 | Suzuki et al. | | |
| 2010/0102945 A1 | 4/2010 | Watson et al. | | |
| 2010/0253496 A1* | 10/2010 | Nishikawa | ............... | G01D 7/00 340/459 |
| 2011/0106344 A1* | 5/2011 | Geoffroy | ............. | G05D 1/0044 701/16 |
| 2013/0018538 A1* | 1/2013 | Miura | ................ | G01C 21/3617 903/930 |
| 2016/0243941 A1* | 8/2016 | Kishida | .................. | B60K 35/00 |
| 2017/0053616 A1* | 2/2017 | Mueller | ................ | G09G 5/003 |
| 2017/0113612 A1* | 4/2017 | Taguchi | .................... | B60R 1/00 |
| 2017/0120750 A1* | 5/2017 | Romani | ................ | B60K 35/00 |
| 2017/0203653 A1* | 7/2017 | Ogasawara | ............ | B60K 37/02 |
| 2017/0203661 A1* | 7/2017 | Nishinaka | ............. | B60L 3/0046 |
| 2017/0274774 A1* | 9/2017 | Iwaya | ...................... | B60K 6/22 |
| 2018/0334034 A1 | 11/2018 | Okuji et al. | | |
| 2020/0357364 A1* | 11/2020 | Endo | ................... | G09G 3/3413 |

FOREIGN PATENT DOCUMENTS

| | | |
|---|---|---|
| JP | 4155321 B2 | 9/2008 |
| JP | 2016-2808 A | 1/2016 |
| WO | WO 2015/190062 A1 | 12/2015 |
| WO | WO-2015190062 A1 * | 12/2015 ............. B60K 35/00 |

OTHER PUBLICATIONS

Written Opinion of the International Searching Authority for PCT/JP2020/002259 dated Mar. 31, 2020.
International Preliminary Report on Patentability and English translation of the Written Opinion of the International Searching Authority for International Application No. PCT/JP2020/002259, dated Sep. 28, 2021.
Office Action dated May 17, 2022 issued in corresponding Japanese Patent Application No. 2021-508130 with an English Translation.
Chinese Office Action and Search Report for corresponding Chinese Application No. 202080024261.0, dated Apr. 27, 2023, with English translation.
Indonesian Office Action for corresponding Indonesian Application No. P00202107636, dated Mar. 28, 2023, with English translation.

* cited by examiner

14(A)

14(B)

DISPLAY DEVICE

TECHNICAL FIELD

This disclosure relates to a display device for displaying information that reflects a state of a vehicle.

BACKGROUND ART

To an engine vehicle using an engine as a driving power source for running and a hybrid vehicle using an engine and a motor as a driving force source for running, for example, display devices that display information reflecting states of the respective vehicles are provided.

PRIOR ART REFERENCES

Patent Document

[Patent Document 1] Japanese Patent No. 4155321
[Patent Document 2] Japanese Laid-open Patent Publication No. 2016-002808

SUMMARY

Problems

Hereinafter, description will now be made in relation to a problem in such a display device for a vehicle exemplified by a hybrid vehicle. A hybrid vehicle has, as its running mode, an EV (Electric Vehicle) mode that drives the driving wheel only with the motor and a HV (Hybrid Vehicle) mode that drives the drive wheels with the motor and the engine.

A hybrid vehicle runs in the EV mode at the start and then, depending on vehicle state, starts the engine and runs in the HV mode. In such a hybrid vehicle, a display device thereof shows the driver whether the vehicle is running in the EV mode or in the HV mode (e.g., see Patent Document 1).

For example, Patent Document 1 describes one including a first displaying part that displays a state amount that changes in response to an output demand of the driver, and a second displaying part that displays a boundary line representing the state amount at which the driving mode is switched.

In such a display device, a demand has arisen for displaying information reflecting the state of the vehicle in such a manner of being easily understood, and the display device still has to be improved.

With the foregoing problem in view, one of the objects is to provide a display device that displays information reflecting the state of the vehicle in a manner of being easily understood.

Means to Solve Problem

The display device according to the first disclosure that solves the above problem is a display device that displays information of a plurality of variables that reflect a state of a vehicle, the display device including:

a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part; and a second meter image including a second scale displaying part that displays a scale of a second variable included in the plurality of variables and a displaying part that displays the second variable that varies with the state of the vehicle, wherein the first meter image and the second meter image are adjacent to each other.

The display device according to the second disclosure that solves the above problem is characterized in that,
in the display device of the first disclosure,
the indicating part is a reference point of the displaying part in the second meter image.

The display device according to the third disclosure that solves the above problem is characterized in that,
in the display device of the first or second disclosure,
the indicating part are displayed at a center in an up-down direction of the first meter image and the second meter image.

The display device according to the fourth disclosure that solves the above problem is characterized in that,
in the display device of one of the first to third disclosures,
the display part is an image in a band shape.

The display device according to the fifth disclosure that solves the above problem is characterized in that,
in the display device of one of the first to fourth disclosures,
the first meter image and the second meter image are integrally drawn into a cylindrical form.

The display device according to the sixth disclosure that solves the above problem is characterized in that,
in the display device of one of the first to fifth disclosures,
the vehicle mounts thereon an electric motor and an internal combustion engine;
the second variable indicates a first output of the vehicle in a first mode that antecedents running with the electric motor, stopping the internal combustion engine; and
the first variable indicates a second output of the vehicle in a second mode that runs the vehicle, activating the internal combustion engine.

The display device according to the seventh disclosure that solves the above problem is characterized in that,
in the display device of the sixth disclosure,
the second variable indicates a third output of the vehicle in the second mode; and
the third output is different from the second output.

The display device according to the eighth disclosure that solves the above problem is characterized in that,
in the display device of the sixth or seventh disclosure,
the first variable includes a parameter representing an output of the internal combustion engine; and
the second variable includes a parameter representing an output of the electric motor.

The display device according to the ninth disclosure that solves the above problem is characterized in that,
in the display device of one of the sixth to eighth disclosures,
the second meter image includes:
a first region representing a magnitude of regeneration electric power of the electric motor, and
a second region being disposed adjacently to a side of a higher output of the first region and representing an output range when the electric motor is powered running; and
the second region is provided with a third region being disposed on a side of a high output in the second region and indicating an output range in which the internal combustion engine has a high possibility of being started.

Effect

According to the present disclosure, it is possible to provide a display device that understandably displays information that reflect a state of a vehicle

BRIEF DESCRIPTION OF THE DRAWINGS

FIG. 2 is a diagram illustrating display device according to an example of an embodiment of the present disclosure and particularly illustrating displaying when a vehicle system is turned on.

FIG. 3 is a diagram illustrating display in the display device of FIG. 2 when the vehicle is in a runnable state after vehicle system is turned on.

DETAILED DESCRIPTION

Hereinafter, a display device according to embodiments of the present disclosure will be described with reference to FIGS. 1 to 14. Here, description will be made on assumption that the vehicle is a hybrid vehicle, but a target of application of the display device is not limited to this. The target of application of the display device may be, for example, a plug-in hybrid vehicle which can charge its driving-purpose battery with an external commercial power supply, or may be an engine vehicle having only an engine (internal combustion engine).

1. Embodiment 1

The configuration of a display device of this embodiment will be described with reference to FIGS. 1 to 7.

Figure 1:
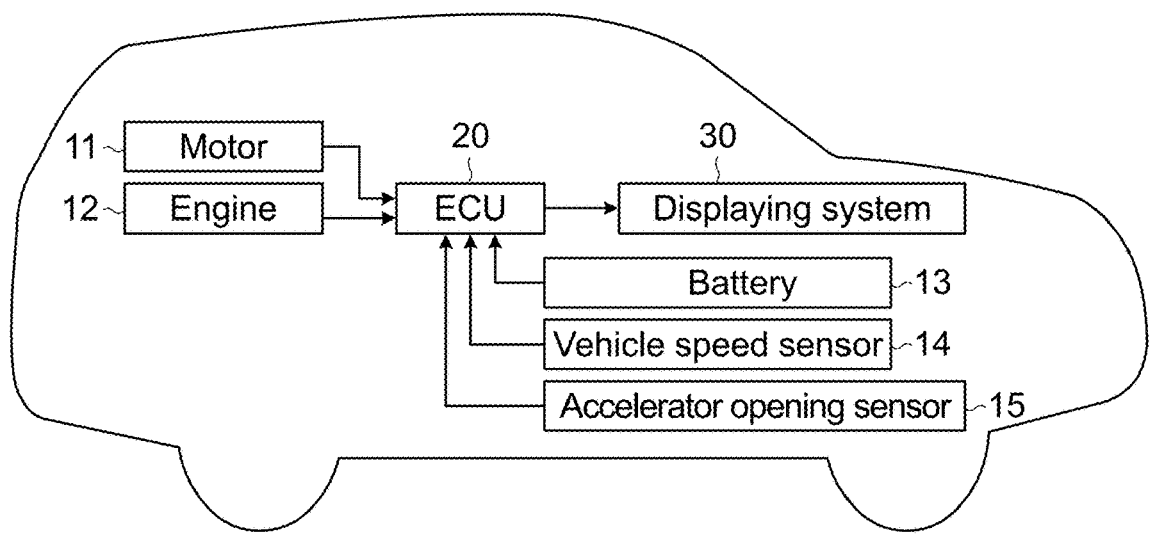
FIG. 1 is a block diagram illustrating a hybrid vehicle.

As shown in FIG. 1, a hybrid vehicle 10 includes, as a driving power source for running, a motor 11 (electric motor) and an engine 12 (internal combustion engine). The motor 11 may be configured to drive the front wheels or the rear wheels, or multiple motors 11 may be provided to drive the front wheels and the rear wheels. The engine 12 may also be configured to drive the front wheels or the rear wheels, or to drive the front wheels and the rear wheels. Further, the hybrid vehicle 10 may have a generator (not shown) which is driven by the engine 12 to generate power.

The hybrid vehicle 10 has, as its running mode, an electric motor output mode (first mode, EV mode) that stops the engine 12 and prioritizes running with the motor 11 (driving the driving wheels) (i.e., running with the motor 11 overrides running with the engine 12); and an internal combustion engine output mode (second mode, HV mode) that activates the engine 12 and runs with, for example, the motor 11 and the engine 12.

The hybrid vehicle 10 also has an ECU (Electronics Control Unit) 20 serving as a controller. The ECU 20 consists of a CPU (Central Processing Unit), a RAM (Random Access Memory), a ROM (Read Only Memory), and an input-output circuit, and is electrically connected to the motor 11 and the engine 12. In addition, the ECU 20 is electrically connected to a driving-purpose battery 13 that supplies electric power to the motor 11, a vehicle speed sensor 14 that detects the vehicle speed, and an accelerator opening sensor 15 that detects the degree of accelerator opening. As the above, the ECU 20 is electrically connected to devices required for information display of the hybrid vehicle 10 and signal values of the devices are input into the ECU 20.

For example, into the ECU 20, a signal value (e.g., motor speed) from the motor 11 and the signal value (e.g., on/off state, engine speed) from the engine 12 are input, and additionally, the signal value (e.g., SOC (State of Charge), a battery output) from the battery 13 and the signal values of the vehicle speed sensor 14 and the accelerator opening sensor 15 are also input.

The hybrid vehicle 10 further includes a displaying system 30 which includes a first display device 40 that is to be described by referring to FIGS. 2 to 6. The displaying system 30, which will be described below with reference to FIG. 7, is electrically connected to the ECU 20 and displays the information of the hybrid vehicle 10 which information the driver requires. The displaying system 30 is preferably a digital meter consisting of a liquid crystal panel. In this example, the first displaying device 40 is included in the displaying system 30, but may alternatively be an independent one device.

The first displaying device 40 displays information of multiple variables that reflects the state of the hybrid vehicle 10, and the multiple variables are output relating the running of the hybrid vehicle 10. The output is obtained by performing an arithmetic processing on a signal value input into the ECU 20, the arithmetic value obtained by the arithmetic processing is input as an output into the first displaying device 40.

As shown in FIGS. 2 to 6, the first displaying device 40 has a first meter image 41 and a second meter image 44, and displays these images adjacent to each other. The first meter image 41 and the second meter image 44 are each drawn in a ring (or cylinder) shape, and are displayed integrally. In other words, these images are in the form of rings (cylinders) displayed integrally by being arranged vertically and adjacently to each other. This displaying manner makes it possible to save the space of the first displaying device 40 and also collectively display the information of the both of the first meter image 41 and the second meter image 44 (e.g., a first scale displaying part 42, an indicating part 43, a second scale displaying part 45, and a displaying part 46 that are to be described below). Here, the two rings vertically arranged are drawn in a shape viewed from the front and diagonally right, but may alternatively be drawn in a shape viewed from the front.

The first meter image 41 includes a first scale displaying part 42 that displays a scale of a first variable included in the multiple variables and an indicating part 43 that indicates the first variable that varies with the state of the vehicle. Here, the first variable is the running output when the engine 12 is activated to run the vehicle, i.e. the running output (engine output, second output) in the internal combustion engine output mode described above.

The indicating part 43 is displayed in a predetermined color (hereinafter, the first color) in the center part in the vertical direction of the first meter image 41. With this configuration, the indicating part 43 is set to indicate the first variable by varying the first scale displaying part 42 with a change of the first variable, also fixing the position of the indicating part 43. Here, the indicating part 43 is a pointer (needle indicator), and the first scale displaying part 42 consists of a scale indicating the magnitude of the first variable and numbers representing the scale. Then, the indicating part 43 indicates the magnitude of the current first variable by shifting the position of the scale representing the magnitude of the current first variable on the first scale displaying part 42 to the position of the pointer of the indicating part 43.

In this first scale displaying part 42, the scale and scale numbers are drawn in three-dimensions. Further, the rotation of the first scale displaying part 42 means that the scale and the scale numbers displayed on the first scale displaying part 42 move as if rotating on the surface of the first meter image 41 in the ring (cylinder) shape from the visual viewpoint of the driver.

In the first scale displaying part 42, "OFF" is displayed at a position distant downward from the scale number "0". This "OFF" is an indication that the hybrid vehicle 10 is not runnable. The scale number "0" indicates that the hybrid vehicle 10 is in a runnable state, and also indicates that the first variable is zero, which means that the engine 12 is stopping.

Figure 2:
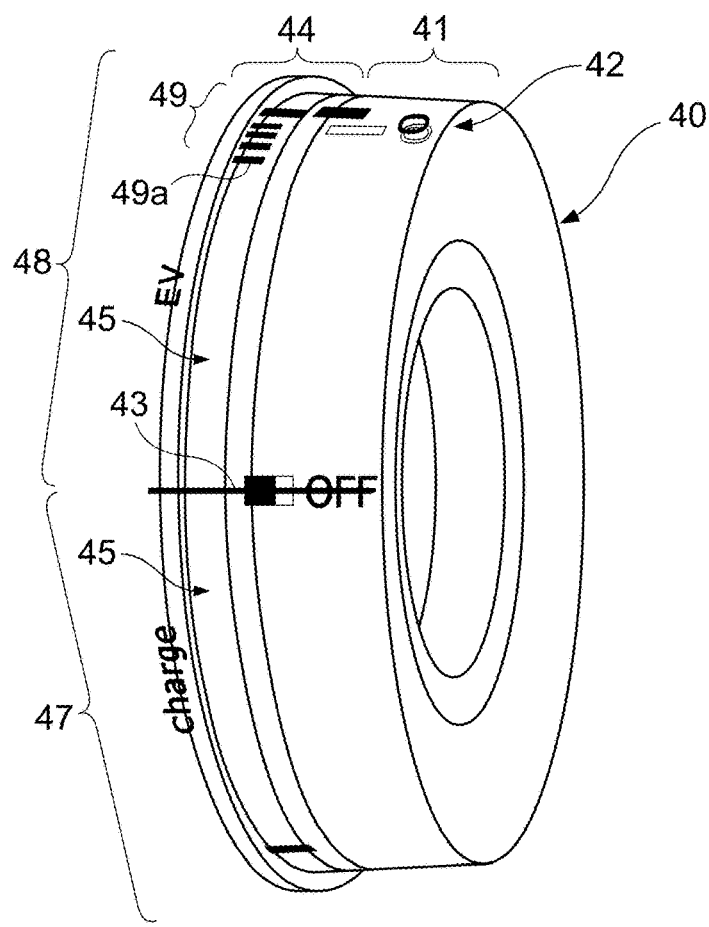
Figure 3:
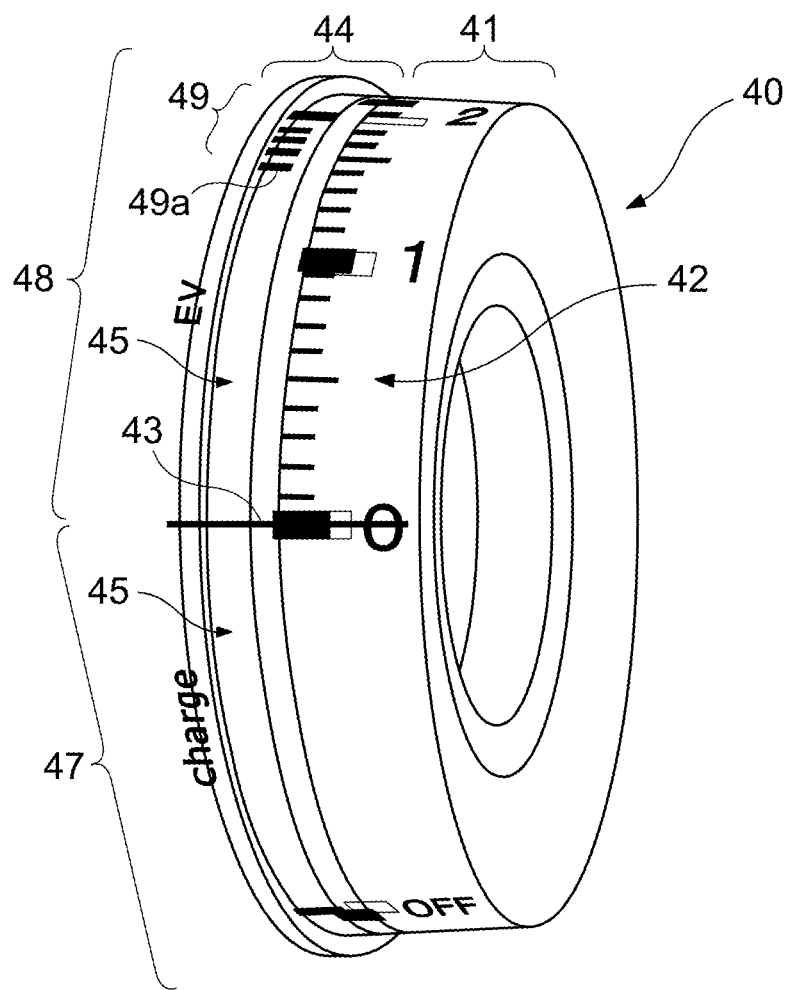

Here, as shown in FIG. 2, when the "OFF" is positioned at the position of the pointer of the indicating part 43, the first meter image 41 is set to display the scale number "0" on the highest portion thereof, and as shown in FIG. 3, when the "0" is positioned at the position of the pointer of the indicating part 43, the first meter image 41 is set to display the "OFF" at the lowest portion thereof.

When engine 12 is starting, the first scale displaying part 42 rotates such that the scale indicating the present first variable moves to the position of the indicating part 43, which had been indicating "0" before the engine starts. For example, assuming that the first variable is the engine speed, and the engine speed comes to be one when the engine is idling after the start of the engine, the scale indicated by the indicating part 43 is rotated from "0" to a scale of, for example, 700 to 1000 [rpm] before and after the start of the engine. Since the first scale displaying part 42 rotates in a short time when the start of the engine 12, this rotation shows dynamic movement to the driver.

After the engine 12 is started, the indicating part 43 indicates the current first variable by rotating the first scale displaying part 42 in accordance with the change of the first variable. In this display, application of a predetermined color (hereinafter a second color) on a colored part 42a positioned below the indicating part 43 allows the driver to easily recognize the current first variable indicated by the indicating part 43. This second color is different from a first color of the indicating part 43 described above.

The first variable is not limited to the engine output, and may alternatively be parameters such as an engine speed of the engine 12, or power (power factor) caused by the operation of the engine 12.

Incidentally, the first variable described above may be configured to be selectable by the driver. For example, a selection screen (not shown) for selecting the first variable is provided to a fifth display device 80 of the displaying system 30 to be described below with reference to FIG. 7, and one parameter may be selected as the running output in the internal combustion engine output mode from the parameters described above by selecting the first variable on this selection screen.

For example, when the engine speed of the engine 12 is used as the first variable, the first meter image 41 will function as a so-called tachometer. Then, when the engine speed is displayed by the first scale displaying part 42 and the indicating part 43, for example, the driver can easily grasp the operation of the engine for a purpose except for warming the catalytic converter even when the engine 12 is operating for warming the catalytic converter.

The second meter image 44 includes a second scale displaying part 45 that displays a scale of a second variable included in the multiple variables, and a displaying part 46 that displays a second variable that varies according to the state of the vehicle. Here, the second variable is the output (motor output) of the motor 11, and is a running output in a state of running with the motor when the vehicle is running, which is the running output in the electric motor output mode, while is regenerating power when the motor 11 is regenerating. The second variable in the electric motor output mode (first mode) represents, for example, a motor output (first output), and the second variable in the internal combustion engine output mode (second mode) represents, for example, a battery output (third output). In the second meter image 44, during the EV running (first mode), the motor output is displayed, and during the HV running (second mode), the battery output is displayed in principle.

Figure 4:
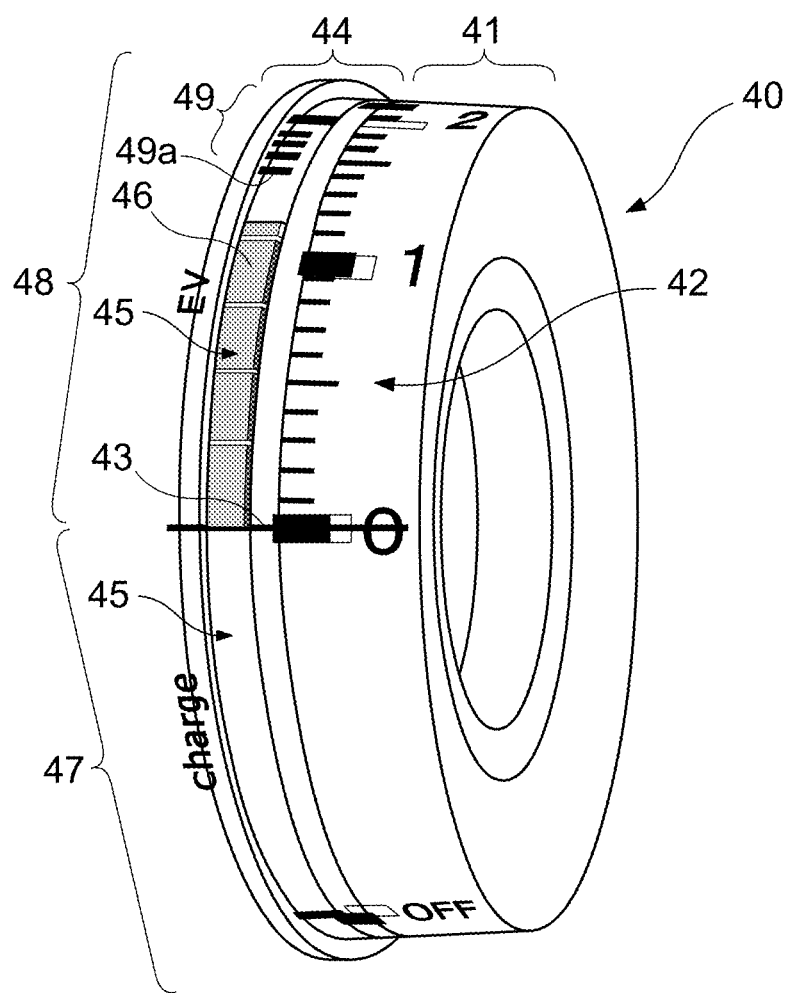
FIG. 4 is a diagram illustrating display in the display device of FIG. 2 in an electric motor output mode.

Then, as shown in FIG. 4, the displaying part 46 in the second meter image 44 is an image in a band shape drawn in the three dimension, and expresses the magnitude of the present second variable by changing the length (the longitudinal length in the drawing) of the band shaped of the displaying part 46 according to the magnitude of the second variable. Therefore, as the second variable increases, the band shape of the displaying part 46 comes to be longer in accordance with the increase. In contrast, as the second variable decreases, the band shape of the displaying part 46 comes to be shorter in accordance with the decrease. Thus, the displaying part 46 represented by an image in a band shape can enhance the visibility thereof. Further, the second scale displaying part 45 displays lines across the width direction (horizontal direction in the drawing) of the band shape of the displaying part 46 at constant intervals.

The pointer of indicating part 43 in the first meter image 41 is extended to the second meter image 44. That is, the indicating part 43 is displayed in the center portion in the vertical direction of the first meter image 41 and the second meter image 44. Thus, by displaying the indicating part 43 in the center portion in the vertical direction of the first meter image 41 and the second meter image 44, the design property thereof is enhanced.

The pointer of this indicating part 43 is the reference point of displaying part 46 in the second meter image 44. For example, the displaying part 46, if displaying the running output of the motor 11, is displayed in a region (second region 48 to be described below) of the second meter image 44 above the pointer of indicating part 43 serving as a reference point, and displaying part 46, if displaying the regenerating power of the motor 11, is displayed in a region (first region 47 described later) of the second meter image 44 below the pointer of indicating part 43 serving as the reference point.

Further, the displaying part 46 changes its color between a case of being displayed in the first region 47 and a case of being displayed in the second region 48. Specifically the display unit 46 has a predetermined color (hereinafter, a third color) when being displayed in the first region 47 and another predetermined color (hereinafter, a fourth color) when being displayed in the second region 48, so that the colors in the above two cases are different from each other. These colors may be different from the first color of the indicating part 43 and the second color of the colored part 42a that are described above, or the fourth color of the displaying part 46 may be the same color or a color of the same system as the second color of the colored part 42a because the both displays are related to the running output. Thus, by changing the color of the displaying part 46 with at least regions, the driver can visually recognize whether the second variable is the running output or the regenerating power with ease.

The running output in the electric motor output mode serving as a second variable during running may be, for example, parameters of the output of the motor 11, the rotational speed of the motor 11, the power (work factor) due to the operation of the motor 11, and the battery output of the battery 13 (assist power of the motor 11). Further, the regenerating power of the motor 11 serving as the second variable during the regeneration may be, for example, parameters of the power generation output of the motor 11 and the charging output to the battery 13. In case where the output related to the motor 11 is used as the second variable, the second meter image 44 will function as a so-called EV power meter.

Incidentally, the second variable described above may also be configured to be selectable by the driver. For example, a selection screen (not shown) for selecting the second variable is provided to the fifth display device 80 of the displaying system 30 to be described below with reference to FIG. 7, and one parameter may be selected as the running output in the electric motor output mode or the regenerating power in the motor 11 is regenerating from the parameters described above by selecting the second variable on this selection screen.

Further, the second meter image 44 includes the first region 47 and the second region 48 disposed adjacent to the high-output side of first region 47, and the second region 48 is provided with a third region 49 disposed in the high-output side of the second region 48.

The first region 47 is a region representing the magnitude of the regenerating power of the motor 11 and is a region below the pointer of the indicating part 43. At the lowest portion of the first region 47, that is, at the lower portion of the second meter image 44, one scale is displayed, which indicates the largest regenerating power. During regeneration by the motor 11, a combination of the second scale displaying part 45 and the displaying part 46 described above is displayed in the first region 47 in accordance with the regenerating power.

The second region 48 is an region representing the running output when the vehicle runs using the motor 11 (when powered running), that is, the range of the running output in the electric motor output mode, and is a region above the pointer of the indicating part 43. During running by the motor 11, a combination of the second scale displaying part 45 and the displaying part 46 described above is displayed in the second region 48 in accordance with the running output.

This second region 48 may also indicate the running output of the motor 11 when the vehicle runs by operating the engine 12, that is, in the internal combustion engine output mode (second mode). In this case, the driver can obtain, as appropriate information according to the running state of the hybrid vehicle 10, the information of the assist output of the motor 11 and can confirm the surplus output of the motor 11 and the battery 13. In this second mode, parameters of the rotational speed of the motor 11, the power (work factor) due the operation of the motor 11, the battery output (assist power of the motor 11) of the battery may be displayed on the second region 48.

The third region 49 is a region representing a range of the running output in the electric motor output mode when the engine 12 has a high possibility of being started. Incidentally, no scale is displayed on the second region 48 excluding the third region 49, but the second scale displaying part 45 that functions as a scale is displayed if the displaying part 46 appears.

Here, a state of prioritizing the running using the motor 11 while stopping the engine 12 is a state in which none of the conditions for starting the engine 12 is satisfied. On the other hand, the state in which the engine 12 has a (high) possibility of being started is a state in which at least one of the multiple conditions for starting the engine 12 is just satisfied. The third region 49 is a boundary between these states, in other words, shows a limit region that prioritizes the running using the motor 11 and the stopping engine 12 and that has a predetermined width. In some conditions, the engine 12 starts at a position below the start point scale 49a, that is, within a range of the second region 48 excluding the third region 49.

This means that the third region 49 included in the second region 48 is an engine starting closing region representing the running output of the motor 11 when the engine 12 has a high possibility of being started because at least one of the conditions to start the engine 12 is about to be satisfied, which means that there is high possibility that the electric motor output mode is shifted to the internal combustion output mode.

Accordingly, in cases where the engine 12 has a low possibility of being started in the motor output mode, the displaying part 46 shifts within the range of the second region 48 except for the third region 49, whereas in cases where the engine 12 has a high possibility of being started, namely, just before the engine 12 is started, the displaying part 46 moves within the range of the third region 49 in the second region 48.

Since the third region 49 representing the output at which the engine 12 has a possibility of being started is provided so as to have a predetermined width, the output when the engine 12 is started can be indicated within the range of the third region 49. Consequently, a predetermined range (i.e., the second region 48 excluding the third region 49) can be indicated to be a region where the engine 12 is not started. In addition, providing a scale only on the third region 49 in the second region 48 allows the displaying part 46 to indicate that the engine 12 has a possibility of being started, so that the driver can easily grasp that the engine 12 is in the state of easily being started. Consequently, the running state of the hybrid vehicle 10 is easily understand, that is, the degree of possibility that engine is to be started is easily understand, which makes the driver possible to drive the hybrid vehicle 10 as desired.

As described above, the first meter image 41 rotates the first scale displaying part 42 in accordance with a change in the running output (first variable) of the engine 12, while fixing the position of indicating part 43, and the second meter image 44 also changes the length of the displaying part 46 in accordance with the change in the output (second variable) of the motor 11, so that the display manner of a variable of the first meter image 41 is different from that of the second meter image 44. Consequently, the driver can sensually grasp the information (state of operating of the hybrid vehicle 10) of the running output of the engine 121 and the output of the motor 11 that are displayed on the displaying device 40 with ease.

Further, rotating the first scale displaying part 42 in accordance with a change in the running output (first variable) of the engine 12, while fixing the position of indicating part 43 in first meter image 41, makes it possible to more clearly notify, when the running in the internal combustion engine output mode is started, the driver of running in the internal combustion engine output mode by dynamic movement of the first scale displaying part 42. In addition, the colored part 42a of the first meter image 41 and the displaying part 46 in the second meter image 44 have different displaying widths and the displaying width of the colored part 42a of the first meter image 41 is thick, which also makes it possible to more clearly notify the driver of running in the internal combustion engine output mode.

Further, in the first region 47 of the second meter image 44, changing the length of the displaying part 46 in accordance with the change in the regenerating power (second variable) of the motor 11 makes it possible, when the battery 13 is charged by regeneration, to more clearly notify the driver of a state of charging the battery by regeneration.

Similarly, in the second region 48 of the second meter image 44, changing the length of the displaying part 46 in accordance with the change in the running output (second variable) of the motor 11 makes the driver possible to visually recognize, when the vehicle runs without starting the engine 12 in the electric motor output mode, that the hybrid vehicle 10 runs without starting the engine 12 in the electric motor output mode with ease, so that it is possible to notify the driver that the vehicle is running in a manner of environmentally friendly.

In particular, since when the vehicle 10 runs with the motor 11 without starting the engine 12, the first meter image 41 does not display colored indication (i.e., does not display the colored part 42a) whereas the second meter image 44 displays the colored displaying part 46 on its second region 48, it is possible to more clearly notify the driver that the hybrid vehicle 10 is in the state of running with the motor 11 without starting the engine 12.

Displaying the displaying part 46 in the first region 47 below the indicating part 43 or in the second region 48 above the indicating part 43 and also applying different colors to the displaying part 46 on the first region and the second region makes it possible notify the driver whether the second variable is the running output or the regenerating power with ease.

Next, the operation of the first displaying device 40 will now be described with reference to FIGS. 1 to 6.

When the driver depresses the ignition switch of the hybrid vehicle 10, the first displaying device 40 first displays the vehicle system-on state (IG-ON) shown in FIG. 2, and then displays, if the hybrid vehicle 10 is in the runnable, a runnable state (Ready-ON) shown in FIG. 3.

As shown in FIG. 2, in the vehicle system-on state, since the hybrid vehicle 10 is not in the runnable state, the first meter image 41 displays "OFF" at the position of the pointer of the indicating part 43, and the first scale displaying part 42 is displayed such that the scale number "0" is displayed on the highest portion thereof. Further, in the second meter image 44 here, since the motor 11 is not rotated, the displaying part 46 is not displayed on both of the first region 47 and the second region 48 of the second scale displaying part 45.

Therefore, since, in the first displaying device 40, the first meter image 41 displays "OFF" at the position of the pointer of the indicating part 43 and the second meter image 44 does not display the displaying part 46, the driver can easily recognize that the vehicle system has been activated but has not come to be runnable (i.e., the state of the hybrid vehicle 10).

Further, as shown in FIG. 3, since, in the runnable state after the vehicle system is turned on, the engine 12 is in the stopping state but the motor 11 is in the runnable state, the first meter image 41 displays the first scale displaying part 42 such that the scale number "0" is displayed at the position of the pointer of the indicating part 43 and also the scale number "OFF" is displayed on the lowest portion thereof. The display is shifted into the state shown in FIG. 3 by shifting and rotating the first scale displaying part 42 being in state shown in FIG. 2 downward. In addition, the second meter image 44 here is in the same state as the second meter image 44 in vehicle system-on state shown in FIG. 2.

Therefore, since, in the first displaying device 40, the first meter image 41 displays a scale number "0" at the position of the pointer of the indicating part 43 and the second meter image 44 does not display the displaying part 46, the driver can easily recognize that the vehicle system has been activated but has come into the runnable state (i.e., the running state of hybrid vehicle 10).

When the driver starts the hybrid vehicle 10, the hybrid vehicle 10 starts to run in the electric motor output mode (first mode) and the first displaying device 40 displays the indication in the electric motor output mode shown in FIG. 4.

As shown in FIG. 4, in electric the motor output mode, the first meter image 41 is in the same state as the first meter image 41 in the runnable state shown in FIG. 3. Here, since the motor 11 is in the state of running output, the second meter image 44 displays the displaying part 46 on the second scale displaying part 45 (second region 48), and also displays the length of the displaying part 46 corresponding to the running output of the motor 11.

Therefore, since, in the first displaying device 40, the first meter image 41 displays a scale number "0" at the position of the pointer of the indicating part 43 and the second meter image 44 displays the displaying part 46, the driver can easily recognize that the hybrid vehicle 10 is running in the electric motor output mode (i.e., the running state of the hybrid vehicle 10).

Then, while the running output in the electric motor output mode is one not exceeding a starting scale 49a, that is, the running output that engine 12 has a low possibility of being started, the displaying part 46 shifts within the range of the second region 48 excluding the third region 49 in accordance with the running output in the electric motor output mode.

Therefore, since the displaying part 46 shifts within the range of the second region 48 excluding the third region 49, the driver can easily recognize that the hybrid vehicle 10 is running in the electric motor output mode and reliably continue running in the electric motor output mode.

In contrast, while the running output in the electric motor output mode is one exceeding a starting scale 49a, that is, the running output that engine 12 has a possibility of being started, the displaying part 46 shifts within the range of the third region 49 of the second region 48 in accordance with the running output in the electric motor output mode until the engine 12 is started.

Therefore, since the driver can operate the hybrid vehicle 10, grasping the approximate positional relationship between the third region 49 having a predetermined width and the displaying part 46, the driver, if not wishing to start the engine 12, operate, for example, an acceleration opening such that the displaying part 46 returns to the range of the second region 48 excluding the third region 49.

Figure 5:
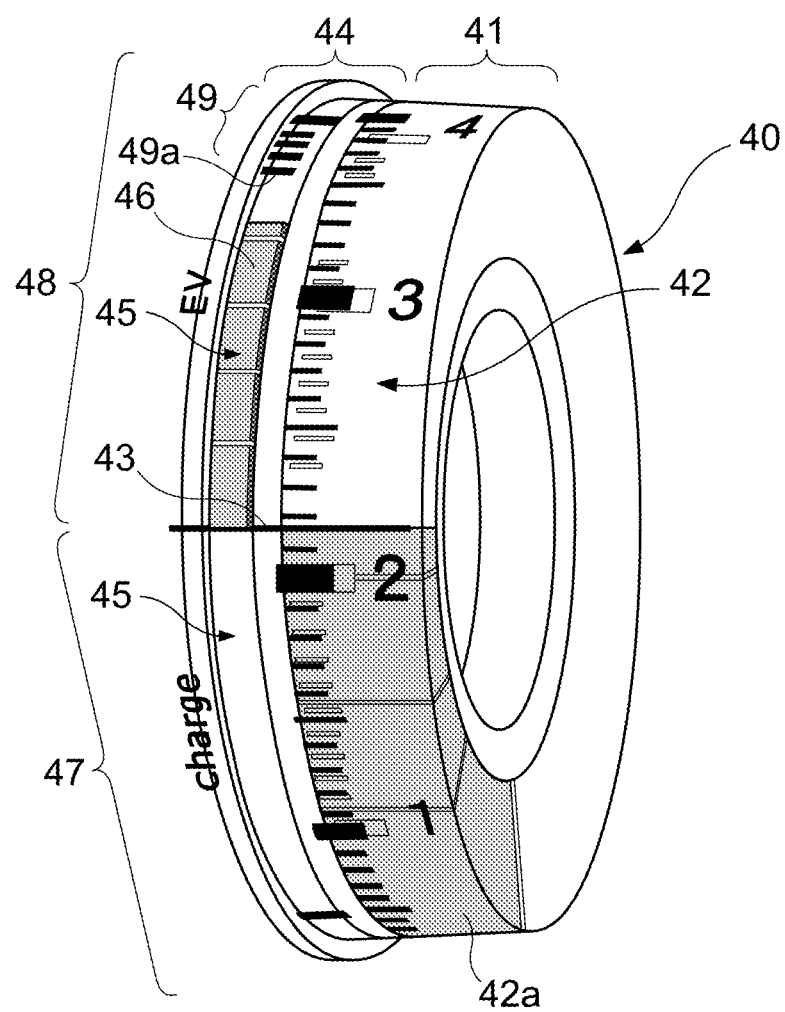
FIG. 5 is a diagram illustrating display in the display device of FIG. 2 after the engine is started.

Then, when the running output in the electric motor output mode, for example, exceeds the maximum output of the battery 13, the engine 12 is started and the hybrid vehicle 10 starts to run in the internal combustion engine output mode (second mode), and the first displaying device 40 displays indication for the internal combustion engine output mode shown in FIG. 5. This state corresponds to cases of powered running for accelerating the hybrid vehicle 10, and accordingly, the hybrid vehicle 10 runs in the internal combustion engine power mode.

As shown in FIG. 5, in the internal combustion engine output mode, the running output of the engine 12 is indicated on the first meter image 41 by rotating the first scale displaying part 42 to cause the indicating part 43 to indicate the scale of the first scale displaying part 42 in accordance with the running output of the engine 12, and also by displaying the colored part 42a on the first scale displaying part 42 at a position below the indicating part 43. Further, when the motor 11 is in the state of running output, the second meter image 44 here displays the indication corresponding to the running output of the motor 11 likewise the second meter image 44 shown in FIG. 4. Alternatively, instead of the running output of the motor 11, a battery output (assist power of the motor 11) of the battery may be displayed as a third output.

Therefore, the driver can easily recognize that hybrid vehicle 10 has shifted from the electric motor output mode to the internal combustion engine output mode by the dynamic movement of first scale displaying part 42 and the indication of the colored part 42a when the vehicle starts running in the internal combustion engine output mode. Further, since the indicating part 43 indicates the scale larger than the scale number "0" and the colored part 42a is displayed in first scale displaying part 42, it is possible to easily recognize that the hybrid vehicle 10 is running in the internal combustion engine output mode (i.e., the running state of the hybrid vehicle 10).

Incidentally, when the hybrid vehicle 10 is decelerated while running in the internal combustion engine power mode, the motor 11 is configured to function as a regenerative brake. That is, in regeneration to decelerate the hybrid vehicle 10, the battery 13 is charged with the power generated by regenerative braking in the motor 11. In this case, the first displaying device 40 displays the indication for regeneration shown in FIG. 6.

Figure 6:
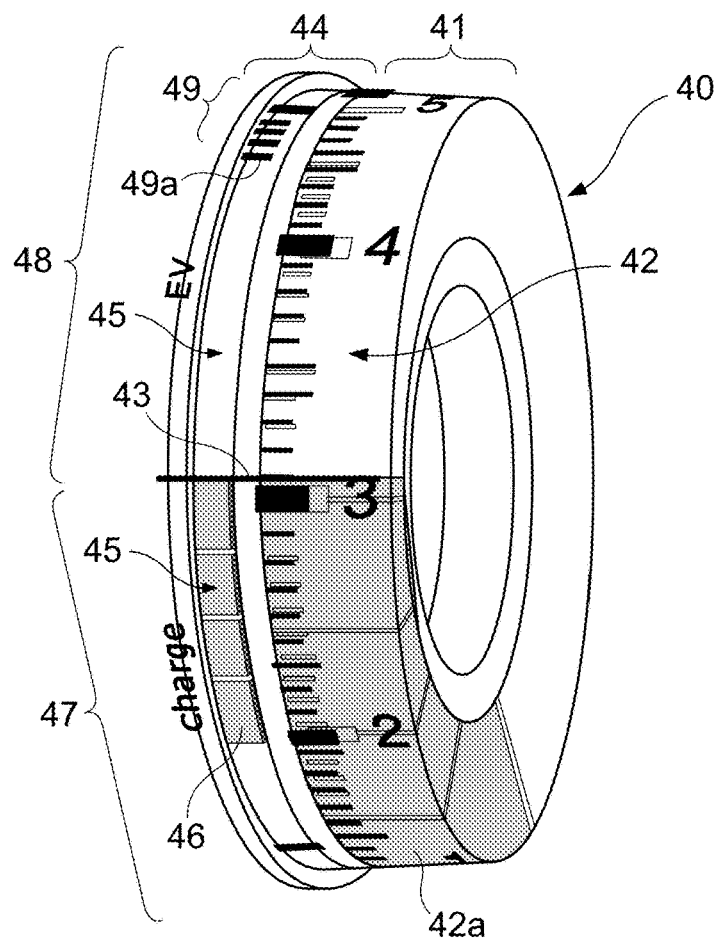
FIG. 6 is a diagram illustrating display in the display device of FIG. 2 when regeneration.
Figure 7:
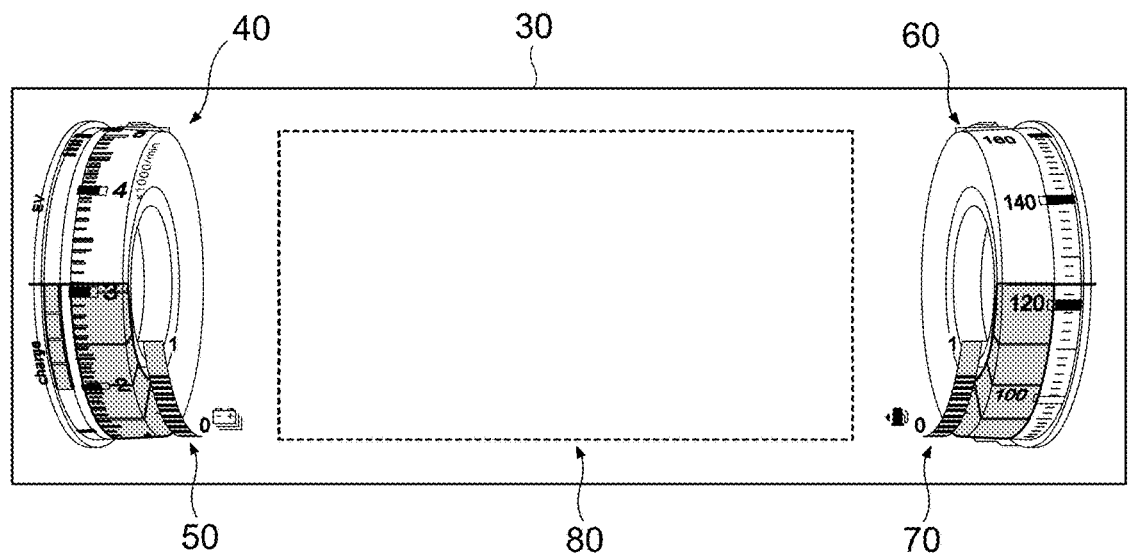
FIG. 7 is a diagram illustrating a displaying system including the display device of FIG. 2.

As shown in FIG. 6, at the time of regeneration, the first meter image 41 displays the indication corresponding to the running output of the engine 12 likewise the first meter image 41 shown in FIG. 5. Further, the second meter image 44 here displays the displaying part 46 in the first region 47, not in the second region 48 so as to have a length corresponding to the length of regenerating power of the motor 11.

Therefore, since the displaying part 46 is displayed in the first region 47, not in the second region 48, the driver can easily recognize that the battery 13 is charged with the power generate by the motor when regenerative braking and also recognize the regenerating power of the motor 11 by referring to the length of the displaying part 46.

In addition, since the displaying part 46 is displayed in the first region 47, not in the second region 48, the driver can easily recognize that the hybrid vehicle 10 is running by operating only the engine 12 in the electric motor output mode (i.e., the running state of the hybrid vehicle 10).

As described above, since, in the first displaying device 40, the first meter image 41 displays the first scale displaying part 42 which rotates in accordance with the running output in the internal combustion engine output mode, the second meter image 44 displays the displaying part 46 which changes in accordance with the running output in the electric motor output mode on the second region 48 (including third region 49), and the second meter image 44 displays the displaying part 46 which changes in accordance with the regenerating power in first region 47, the driver can easily grasp these changes and thereby easily determine the running state of the hybrid vehicle 10. Consequently, the driver easily grasps the correct driving state of the hybrid vehicle 10 and easily drive the hybrid vehicle 10 as desired.

In the present embodiment, the display device of this embodiment is described on an assumption that the display device is applied to a hybrid vehicle, but alternatively the display device of the present disclosure is also applicable to an engine vehicle. In this alternative, the second meter image 44 does not require the first region 47 and the third region 49 described above any longer, but the first meter image 41 and the second region 48 of the second meter image 44 are displayed as described above. For this engine vehicle, an example of the first variable to be displayed in first meter image 41 is an engine speed and an example of the second variable to be displayed in second meter image 44 is a vehicle speed, so that multiple pieces of information that reflects the state of the engine vehicle can be displayed intelligibly.

Next, an example of the displaying system 30 including the first displaying device 40 shown in FIGS. 2 to 6 is shown in FIG. 7.

As shown in FIG. 7, in addition to first displaying device 40 described above, the displaying system 30 includes a second displaying device 50, a third displaying device 60, a fourth displaying device 70, and a fifth display device 80. The second displaying device 50 displays the SOC of the battery 13, the third displaying device 60 displays the vehicle speed of the hybrid vehicle 10, the fourth displaying device 70 displays the fuel remaining amount of the hybrid vehicle 10, the fifth displaying device 80 displays various information about the hybrid vehicle 10, which information covers wide variety of range such as warning, service reminder, average fuel economy, EV cruisable range, and energy flow. Further, the fifth displaying device 80 may display the selection screen and map information described above and also audio information.

In the displaying system 30, the second displaying device 50 displays the vehicle speed using the same configuration as the first meter image 41 of the first displaying device 40 described above, and is drawn in a shape of a ring (cylinder) vertically arranged and seen from the front and diagonally left. In other words, the second displaying device 50 is displayed in a line symmetrical shape with the displaying device 40. The second displaying device 50 may also be drawn as a shape viewed from the front. In order to deal with recent enhancement in functions of a vehicle, a wide variety of information need to be provided to the driver. By forming the first displaying device 40 and the second displaying device 50 into the above shapes, it is possible to reserve a wide space between the first displaying device 40 and the second displaying device 50. This makes it possible to display a large amount of information on the fifth displaying device 80 for displaying a wide variety of information.

2. Embodiment 2

The configuration of a display device of this embodiment will be described with reference to FIGS. 8 to 14.

Figure 8:
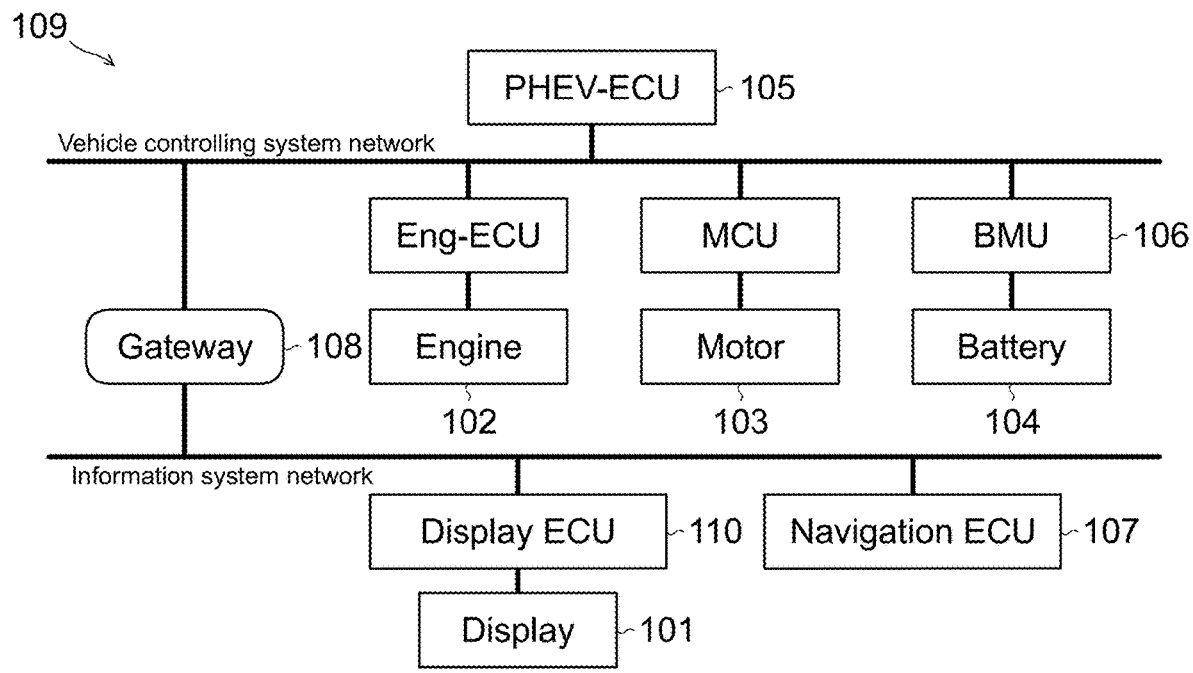
FIG. 8 is a network diagram showing a vehicle to which a vehicle display device of a second embodiment is applied.

The display device for a vehicle according to the present embodiment is applied to a vehicle 109 shown in FIG. 8. This vehicle 109 is a hybrid vehicle equipped with an engine 102, a running-purpose motor 103 and a running-purpose battery 104. These devices are controlled by electronic control devices (computer) such as a PHEV-ECU 105 (Pl-ugin Hybrid Electric Vehicle Electronic Control Unit,), a battery ECU 106 (BMU, Battery Management Unit), an engine ECU (Eng-ECU), and a motor ECU (MCU, Motor Control Unit), which are integrated into a vehicle controlling system network in the vehicle.

The vehicle 109 has two running modes of a first mode and a second mode. The first mode is a mode (electric motor output mode, EV mode) that runs the vehicle 109 only with the driving power of the running-purpose motor 103, and the second mode (internal combustion engine output vehicle, HV mode) is one that runs the vehicle 109 with the driving power of the engine 102 and the running-purpose motor 103 in combination. The first mode is mainly set for low-speed running and low-load running (e.g. at the start of the vehicle 109), and the second mode is mainly set for high-speed running and high-load running.

In either running modes, regenerating power is generated and running-purpose battery 104 is charged when the running-purpose motor 103 inertially rotates. Assuming that an output value when running-purpose motor 103 is powered running is positive, the regenerating electric power amount can be regarded as a motor output having a negative value. Therefore, the regenerating electric power amount can be expressed on the same number lines as the motor output.

Figure 9:
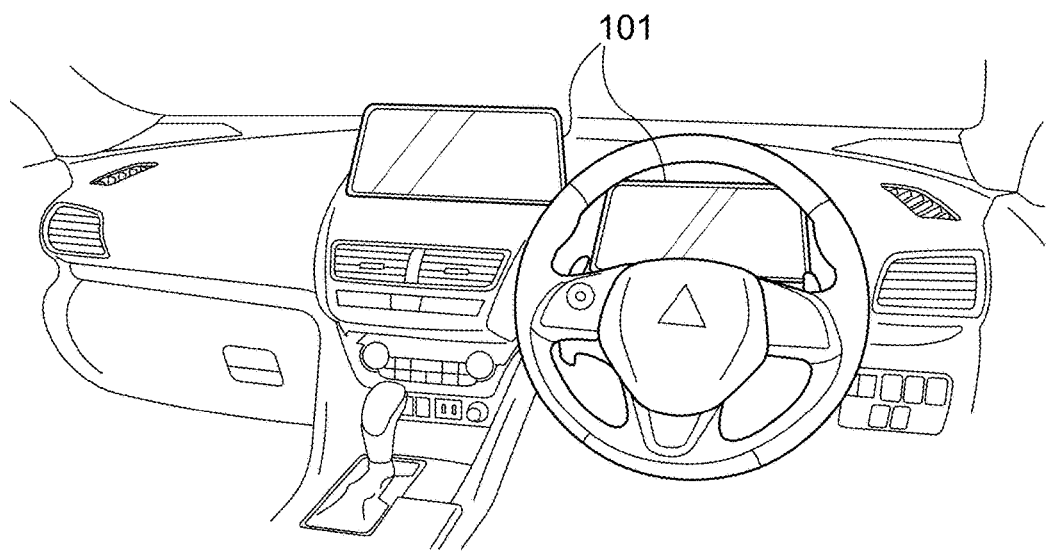
FIG. 9 is a schematic diagram showing vehicle compartment to which a vehicle display device of the second embodiment is applied.

A display 101 is installed in the compartment of the vehicle 109 to provide visual information to the occupant. The display 101 is a display device such as a liquid crystal display or an organic electro-luminescence (EL) device, and is disposed at any position in the vehicle compartment. The display 101 of the present embodiment is set at a position that is easily seen from the driver, such as at least in front of the driver (in front of the steering) or in front of the center of vehicle (in front of a middle point between the driver's seat and in the passenger seat), as shown in FIG. 9. Incidentally, the display 101 may be arranged in a position easily seen from a passer on the passenger seat or an occupant on the rear seat, or multiple displays 101 may be disposed in the vehicle compartment.

To the information system network, electronic control devices such as a navigation ECU 107 or a display ECU 110 are connected. The display 101 functions as an output device of the navigation ECU 107 and the display ECU 110, and may display, for example, vehicle speed information, fuel information, battery information, driving power information, running distance information, time information, map information, and route guidance information, and the like. In cases where the vehicle 109 is equipped with, for example, an audio control device or an Internet connection control device, the display 101 may be used as an output device of these devices.

The vehicle controlling system network and the information system network are connected via a gateway 108. The gateway 108 is a signal converter that bridges communication among multiple networks different in, for example, a signal level, a communication rate, and communication protocol. The display ECU 110 of this embodiment obtains results of arithmetic operations performed by the PHEV-ECU 105, the battery ECU 106, the Eng-ECU, and the MCU through the gateway 108. For example, an output (motor output) of the running-purpose motor 103, an output of the engine 102, an engine speed, a remaining amount (SOC; State Of Charge) of the running-purpose battery 104, and the cruisable range are input into the display ECU 110 according to the requirement.

The display ECU 110 includes a processor (central processing device), a memory (main memory, primary storage device), an auxiliary storage device, and the like, which are not shown and are communicably connected to each other through an internal bus. The processor is a central processing device that includes a control unit (control circuit), an arithmetic unit (operation circuit), a cache memory (registers), for example. The memory is a storage device that stores a program and data being operated, and is exemplified by a ROM (Read Only Memory) and a RAM (Random Access Memory). The auxiliary storage device is a memory device that stores data and firmware that are to be stored longer than in the memory, and is exemplified by a non-volatile memory such as flash memory and an EEPROM (Electrically Erasable Programmable Read-Only Memory).

The display ECU 110 has an infographic presentation function that displays parameter information (information on variables that reflect the status of vehicle 109) related in the vehicle 109 on the display 101. Here, the information of various variables is displayed by the image which combines the scales and pointers of a number line. The display ECU 110 of the present embodiment has a function of presenting infographics in a two-dimensional CG (Computer Graphics) and also in a three-dimensional CG. These types can be changed at any timing according to the preference of the occupant, and can be switched according to the running state of the vehicle 109 (when a predetermined condition is satisfied).

Figure 10:
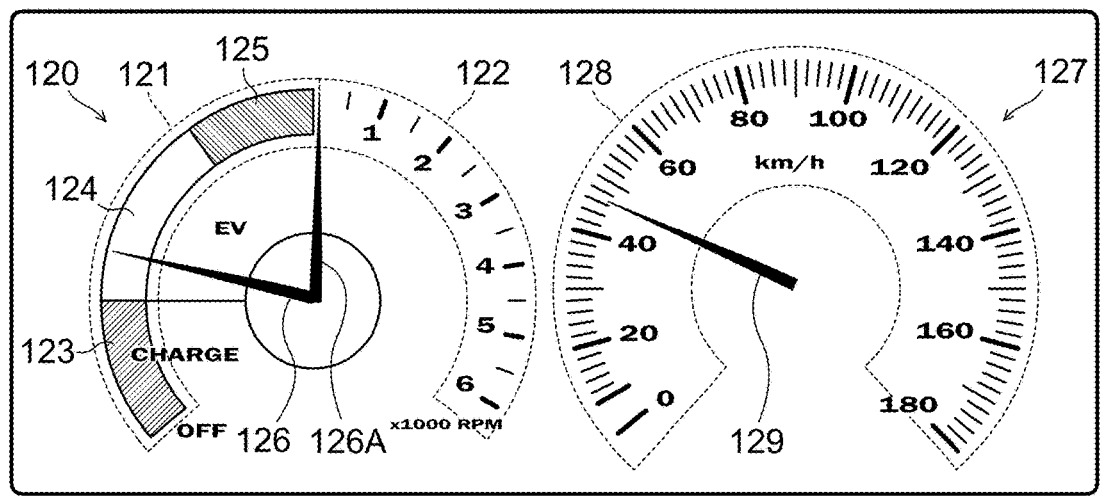
FIG. 10 is a diagram illustrating an example of displaying (two-dimensional CG) of the second embodiment.

FIG. 10 is an example of displaying on the display 101 using a two-dimensional CG. The image drawn on the left side of FIG. 10 is a power meter 120, and the image on the right side is a speed meter 127. The power meter 120 displays a motor output and an engine speed adjacently to each other, and the speed meter 127 displays only the vehicle speed. Either meters 120 and 127 are drawn such that the positions of the scales arranged in arc shapes (scales of number lines) are fixed and pointers are drawn so as to rotate and move at angular displacements corresponding to the values of the output and the vehicle speed. By reading the scale pointed by the needle on a number line, the value of each parameter can be grasped.

The left half region of the power meter 120 is a motor or running-purpose battery output gauge 121 (hereinafter, also referred to as a motor output gauge 121) and the right half region is an engine speed gauge 122. The motor output gauge 121 is provided with a regeneration region 123, a powered running region 124, and a first movable needle 126. The engine speed gauge 122 is provided with a third movable needle 126A indicating an engine speed. Third movable needle 126A points 0 during the EV running. First movable needle 126 also indicates an output power or a battery output when the HEV running.

The regeneration region 123 of the motor output gauge 121 is a region in which a negative motor output corresponding to the regenerating electric power amount is expressed in the angular displacement of the first movable needle 126. The powered running region 124 is a region in which a motor output in the first mode is expressed in the angular displacement of the first movable needle 126. In the powered running region 124, the high-output area is an engine combined-use region 125. The engine combined-use region 125 indicates an output range in which the engine 12 can be started (the range of the output in which the engine 12 has a high possibility of being started).

In the engine combined-use region 125, the engine 12 is sometimes started according to a predetermined running condition, and the running mode of the vehicle 19 may shift from the first mode to the second mode. At this time, the engine speed comes to be the state being expressed by the angular displacement of third movable needle 126A. By checking whether or not the third movable needle 126A directs 0, the occupant can determine whether the running state of the vehicle 109 is the first mode or the second mode.

The speed meter 127 is provided with a vehicle speed gauge 128 and a second movable needle 129. The vehicle speed gauge 128 is a region in which the vehicle speed is expressed by the angular displacement of the second movable needle 129. In addition to (or in place of) an image simulating an analog meter as shown in FIG. 10, an image simulating a digital meter may be displayed. Alternatively, the analog meter display and the digital meter display may be switched according to the requirement depending on the preference of the occupant.

Figure 11:
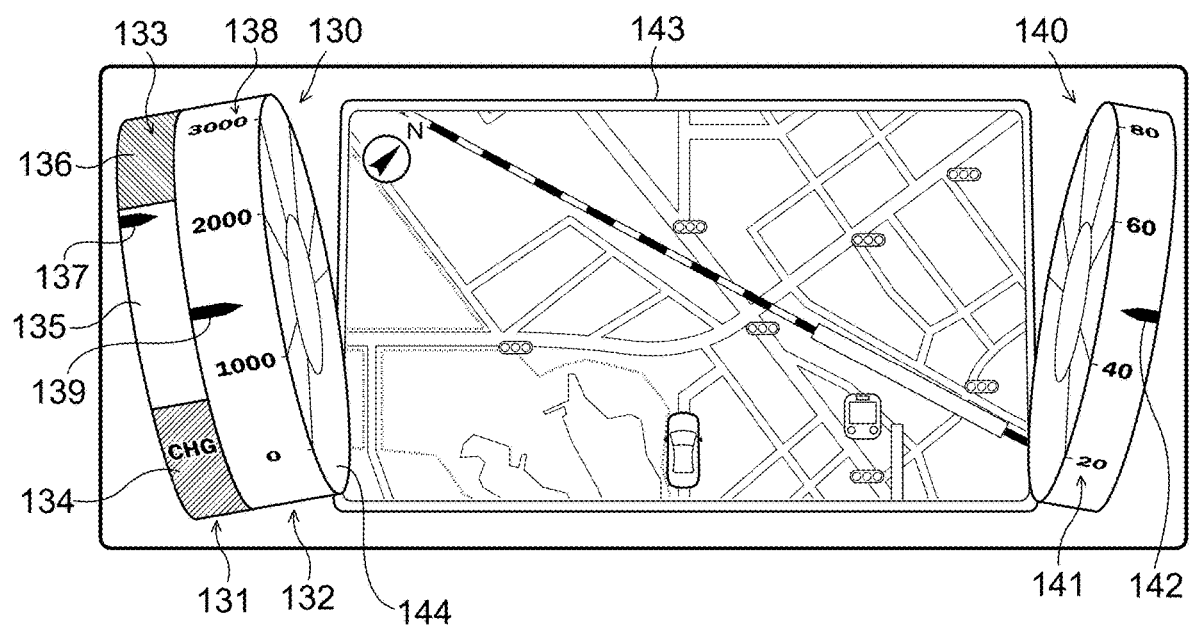
FIG. 11 is a diagram illustrating an example of displaying (three-dimensional CG) of the second embodiment.

FIG. 11 shows an example of illustration of a display 101 using a three-dimensional CG. In FIG. 11, a three-dimensional power meter 130 is displayed at the left end and a three-dimensional speed meter 140 is displayed at the right end. These three-dimensional meters 130 and 140 have smaller dimensions in the width direction compared with the case of two-dimensional CG, and compactly summarizes the necessary information. On the screen center part sandwiched between the three-dimensional meters 130 and 140, a navigation screen 143, such as route guidance and a maps, is displayed by the navigation ECU 107.

The three-dimensional power meter 130 is provided with a first meter image 131 corresponding to the motor output gauge 121, and a second meter image 132 corresponding to the engine speed gauge 122. The first meter image 131 and the second meter image 132 are animated images that display parameter information of the vehicle 109 by utilizing the surface of a polygon (the surface of a virtual three-dimensional object). The polygon is preferably a cylindrical body such as a cylinder or a square cylinder, more preferably a cylindrical surface (side portion) of the polygon. The first meter image 131 and the second meter image 132 shown in FIG. 11 are each drawn on the surface of a cylindrical polygon. The cylindrical face on which the first meter image 131 is drawn is coaxial with the cylindrical surface on which the second meter image 132 is drawn, and the radii of these cylinders are also approximately the same. Accordingly, the first meter image 131 and the second meter image 132 are be displayed integrally on one cylindrical surface.

The first meter image 131 is an image of a meter of a number line having a fixed scale and a movable needle. This first meter image 131 is suitable when the variation range of a parameter to be indicated is relatively narrow, or when the positional relationship (ratio or relative value) of the parameter value to the entire variation range is desired to be indicated. Examples of parameters displayed in first meter image 131 include motor output, a remaining amount (SOC) of the running-purpose battery 104, and a fuel remaining amount.

Incidentally, the first meter image 131 in Example 2 corresponds to the second meter image 44 in Example 1. Similarly, the second meter image 132 in Example 2 corresponds to the first meter image 41 in Example 1.

Using the first meter image 131 makes it easier to intuitively grasp the relative magnitude of the parameter value. For example, expressing the remaining amount of the running-purpose battery 104 in the first meter image 131 makes it easier to visually grasp not only the remaining amount itself, but also additional information such as the amount of charge, the charging time, and the charging cost (information on the power consumption that is complementarily relationship to the remaining amount of the running-purpose battery 104, and information associated therewith) for making the battery into the fully charged state at a charging station.

In contrast, the second meter image 132 is an image of a meter in which the needle is fixed and the scale of the number line is moved (rotated). This second meter image 132 is suitable when the variation range of a parameter to be indicated is relatively wide, or when the magnitude (absolute value) of the parameter value is desired to be indicated. Examples of the parameters displayed on the second meter image 132 include an engine speed, a cruisable range, and a vehicle speed. Using the second meter image 132 makes it easier to precisely grasp the parameter value. The second meter image 132 of the present embodiment is displayed in such an angle that a sign on top surface 144 (or the bottom surface) of the cylindrical body is visible so that the reference position of the scale drawn on the cylindrical surface can be grasped.

The first meter image 131 shown in FIG. 11 includes a motor or running-purpose battery output gauge 133 (hereinafter, also referred to as a motor output gauge 133) drawn so as to be fixed on the cylindrical surface and a movable needle 137 drawn so as to slide on the surface of the motor output gauge 133. The motor output gauge 133 (first scale displaying part) is an image that displays a scale of the first variable, which is one of the multiple variables that reflects the state of vehicle 109. The first variable of the present embodiment is a motor output (or the output of the running-purpose battery). Further, the movable needle 137 (first indicating part) is an image indicating the value of the first variable that varies according to the state of the vehicle 109. The magnitude of the motor output at that time point is grasped by associating the scale shown on the motor output gauge 133 with the position indicated by the moveable needle 137. In the first meter image 131, the movable needle 137 moves under a state where a motor power gauge 133 is fixed.

The motor output gauge 133 is provided with a regeneration region 134 (first region) and a powered running region 135 (second region). The powered running region 135 is a region representing the output range when the running-purpose motor 103 is powered-running and is disposed adjacent to the higher-output side of the regeneration region 134. This powered running region 135 includes an engine combined-use region 136 (third region) that indicates an output range in which the engine 102 can be started (the range of the output in which the engine 102 has a high possibility of being started). The engine combined-use region 136 is disposed on the higher output side in the powered running region 135. These regions 134-136 correspond to regions 124-126 in the two-dimensional power meter 120.

The second meter image 132 includes a movable gauge 138 (second scale displaying part) drawn on the cylindrical surface of the rotatable cylinder and a fixed needle 139 (second indicating part) drawn in a fixed position. The movable gauge 138 is an image that displays a scale of the second variable, which is one of the multiple variables that reflects the state of vehicle 109. On the movable gauge 138, the number for the scale is written. The second variable of the present embodiment is an engine speed (or the output of the engine). Further, the fixed needle 139 is an image indicating the value of the second variable that varies according to the state of the vehicle 109. The magnitude of the engine speed at that time point is grasped by associating the scale indicated on the movable gauge 138 with the position indicated by the fixed needle 139. In the second meter image 132, the movable gauge 138 rotates under a state where the fixed needle 139 is fixed. Incidentally, the motor output gauge 133 and the movable gauge 138 are drawn in cylindrical shape (on the same cylindrical surface) to be integrally displayed.

The three-dimensional speed meter 140 includes a vehicle speed movable gauge 141 drawn on the cylindrical surface of the rotatable cylinder and a second fixed needle 142 drawn in a fixed position. In the three-dimensional speed meter 140, the vehicle speed movable gauge 141 rotates under a state where the second fixed needle 142 is fixed. The magnitude of vehicle speed at that time point is grasped by associating the scale shown on the vehicle speed movable gauge 141 with the position indicated by the second fixed needle 142.

Figure 12:
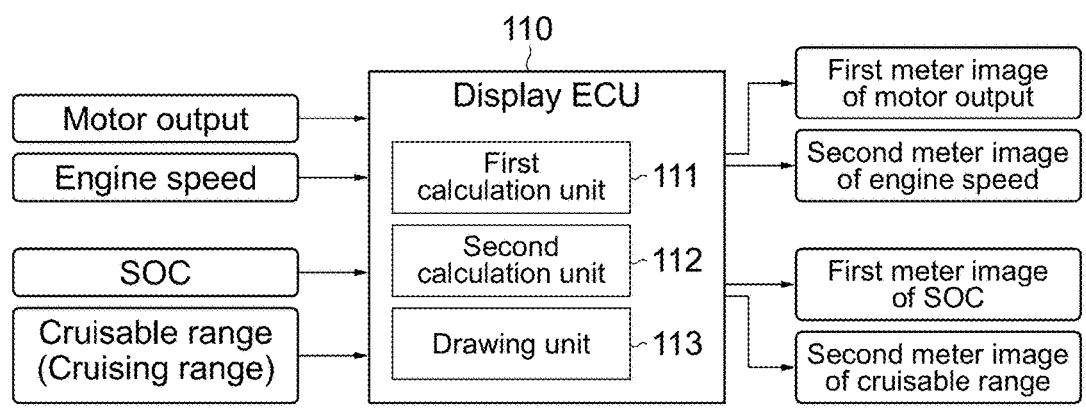
FIG. 12 is a block diagram showing the function of a display ECU of the second embodiment.
Figure 13:
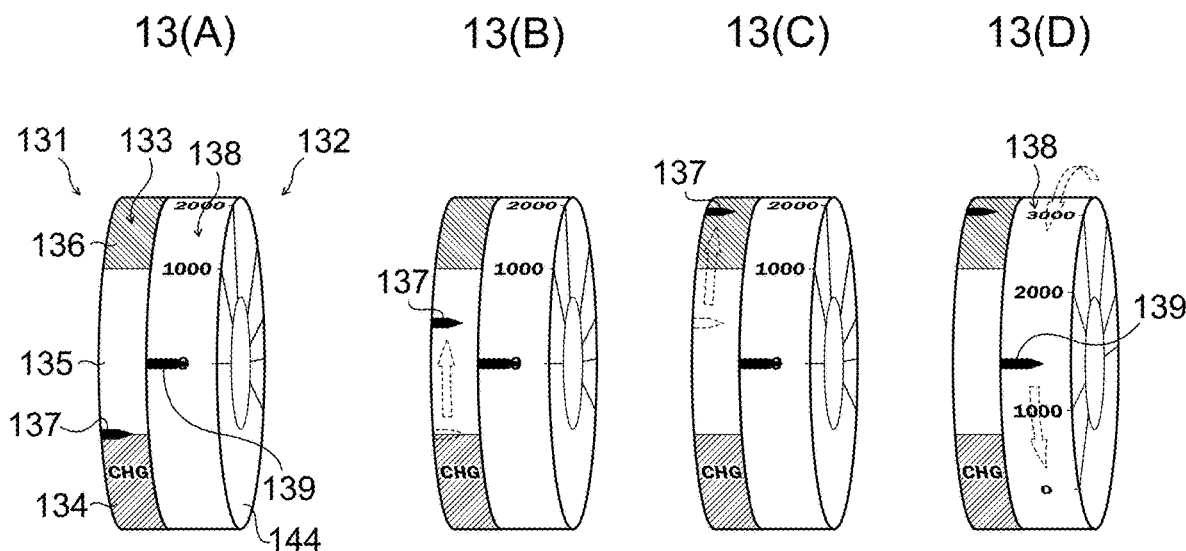
FIGS. 13(A) to 13(D) are diagrams illustrating movement of first and second meter images in the second embodiment.
Figure 14:
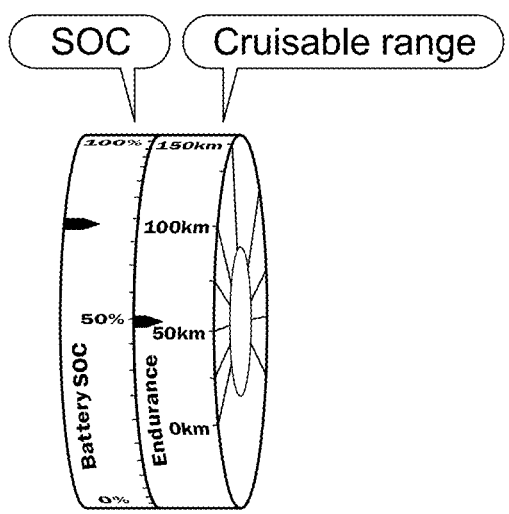
FIGS. 14(A) and 14(B) are diagrams illustrating alternative displaying on a display of the second embodiment.
Figure 14:
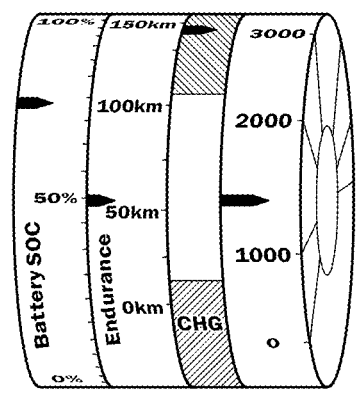

FIG. 12 is a block diagram showing the function of a display ECU 110. The display ECU 110 is provided with a first calculating unit 111, a second calculating unit 112, and a drawing unit 113. These elements are shown by classifying the control contents in the display ECU 110 for convenience, and each element may be described as an independent program, or may be described as a complex program that combines two functions.

The first calculating unit 111 calculates the position of the movable needle 137 in first meter image 131. The position of the movable needle 137 is calculated to correspond to a value of, for example, a motor output, a remaining amount (SOC) of the running-purpose battery 104, or a remaining amount (first variable indicated by the first meter image 131). In the present embodiment, the moving amount of the movable needle 137 along the virtual cylindrical surface (first cylindrical surface) on which the motor output-gauge 133 is engraved is calculated. On the other hand, the second calculating unit 112 calculates the position of the movable gauge 138 in the second meter image 132. The position of the moveable gauge 138 is calculated to correspond to a value of, for example, an engine speed, a cruisable range, or a vehicle speed (second variable indicated by the second meter image 132). In the present embodiment, the rotation angle of a cylindrical body having the virtual cylindrical surface (second cylindrical surface) on which the moveable gauge 138 is engraved is calculated.

The position of the movable needle 137 in Example 2 corresponds to the upper end portion of the displaying part 46 in Example 1. Accordingly, in relation to Example 1, the first calculating unit 111 has the function of generating a second meter image 44 including a second scale displaying part 45 and a displaying part 46. Similarly, the second calculating unit 112 has the function of generating a first meter image 41 including a first scale displaying part 42 and an indicating part 43.

The drawing unit 113 draws the first meter image 131 and the second meter image 132 adjacently to each other. As shown in FIG. 11, the second meter image 132 is drawn in such an angle that the top face 144 of the cylindrical body on which the second meter image 132 is drawn is visible. On this top face 144, lines and symbols representing the reference positions (e.g., positions corresponding to round numbers such as 0, 1000, and 2000 [rpm]) of the scale drawn on the cylindrical surface are drawn. This makes it possible to easily grasp the rotation angle and the rotation status of the movable gauge 138 of the second meter image 132.

FIGS. 13(A) to 13(D) are diagrams for explaining the movement (animation) of the first meter image 131 and the second meter image 132. As shown in FIG. 13A, when the engine 102 and the running-purpose motor 103 of the vehicle 109 are stopped, i.e., not operating, the movable needle 137 of the first meter image 131 is drawn at the initial position (the position where the motor output is zero), and the movable gauge 138 of the second meter image 132 is drawn at the initial position (the position where the engine speed is zero). At this time, the running mode of the vehicle 109 is the first mode, and when an occupant depresses the accelerator pedal, the vehicle starts to powered-run with the driving power of only the running-purpose motor 103. As shown in FIG. 13B, the movable needle 137 of the first meter image 131 moves along the surface of the motor output gauge 133 to a position representing the value of the motor output. The apparent direction of movement of the movable needle 137 is upward as indicated by a dashed white arrow in the drawing.

When the occupant further depresses the accelerator pedal, the movable needle 137 further moves upward and exits the powered running region 135 to enter the engine combined-use region 136 as shown in FIG. 13C. When a predetermined running condition is satisfied, the engine 102 is started. Responsively, the movable gauge 138 of the second meter image 132 rotates and is drawn such that the value of the engine speed matches the position of the fixed needle 139 as shown in FIG. 13D. The apparent direction of movement of the movable gauge 138 is downward as indicated by a broken line white arrow in the figure. Thus, the direction of rotating the movable gauge 138 in the second meter image 132 is opposite to the direction of rotating the movable needle 137 in the first meter image 131.

FIG. 14(A) shows an example of displaying of a case where a remaining amount (SOC) and a cruisable distance of the running-purpose battery 104 adjacently to each other, The remaining amount (SOC) is preferably drawn as the first meter image 131 and the cruisable range is preferably drawn as the second meter image 132. Further, FIG. 14(B) is an example of a case where three or more parameters are displayed adjacently. In this case, if there are multiple meter images each in which a needle moves, it is preferable not to adjoin these images. Similarly, it is preferable that meter images each in which the scale moves are not adjoin each other.

(1) As shown in FIG. 11, by adjacently displaying the first meter image 131 in which the movable needle 137 moves under a state where the motor output gauge 133 is fixed and the second meter image 132 in which the movable gauge 138 under a state where the fixed needle 139 are fixed, the displaying region can be compactly summarized, avoiding misreading of the motor output (first variable) and the engine value (second variable). This can enhance the readability and the understandability of the variable information representing the state of the vehicle 109, and enhances the efficiency in transmitting information. Such a user-friendly UI can be provided and therefore the convenience can be improved.

Incidentally, the first meter image 131 can intuitively transmits the relative magnitude of the parameter values. For example, in addition to the value of the current motor output, the extent of depressing the acceleration pedal to start the engine 102 (i.e., capability of the running-purpose motor 103 to solely run the vehicle 109 and also the ample power of the motor output) can be intuitively notified. On the other hand, the second meter image 132 can precisely notify the magnitude (absolute value) of the parameter values.

(2) As shown in FIG. 11, in the above three-dimensional power meter 130, the motor output gauge 133 and the movable gauge 138 is integrally drawn in a cylindrical shape. This makes it possible to reduce the width of the meter images, so that a display region of other information (e.g., route guidance and maps by the navigation ECU 107) can be reserved.

(3) In the motor output gauge 133 and the movable gauge 138 of the above three-dimensional power meter 130, only the movable gauge 138 is marked with numbers for the scale. Thus, by displaying one of the neighboring scales (the motor output gauge 133) in region and the other scale (the movable gauge 138) in number, the two types of information adjacent to each other is differentiated (clearly distinguished), thereby facilitating information recognition. Therefore, the readability and understandability of variable information can be further enhanced, and the transfer efficiency of information can be enhanced.

(4) Further, arranging the motor output and the engine speed (engine output) adjacently to each other makes it possible to easily grasp the overall output state of the vehicle 109 and the operating state of the engine 102 and the running-purpose motor 103 at a glance, thereby enhancing the convenience.

(5) As shown in FIG. 14(A), arranging the remaining amount (SOCs) and the cruisable range adjacently to each other makes it possible to easily grasp the power supply capacity of the running-purpose battery 104 and the EV cruisable range of the vehicle 9 at a glance, thereby improving convenience.

(6) As shown in FIG. 14(B), arranging the meter images having movable needles not to be adjacent to each other makes it possible to prevent reading errors of each meter, thereby enhancing convenience.

(7) Similarly, arranging the mater images having movable scales not to be adjacent to each other makes it possible to prevent reading errors of each meter, thereby enhancing convenience.

(8) In the above display ECU 110, the first calculating unit 111 calculates an amount of movement of the movable needle 137 along a virtual cylindrical surface on which the scale (motor output gauge 133) of first meter image 131 is engraved. This can move the movable needle 137 three-dimensionally, and thereby enhance the aesthetics and appearance of the first meter image 131. Similarly, the second calculating unit 112 calculates the rotation angle on a virtual cylindrical surface on which the scale of the second meter image 132 (movable gauge 138) is engraved. This can move the movable gauge 138 three-dimensionally, and thereby to enhance the aesthetics and appearance of the second meter image 132.

(9) As shown in FIG. 11, visibly arranging the top face 144 on the side of the second meter image 132 makes it possible to visually grasp the rotation angle and the rotation status of the movable gauge 138 of the second meter image 132. This enhances the transfer efficiency of information.

Incidentally, the above embodiment is merely exemplary, there is no intention to exclude the application of various modifications and techniques not explicit in the present embodiment. Each configuration of the present embodiments can be variously modified and implemented without departing from the scope thereof. Also, the configuration can be selected or omitted according to the requirement or appropriately combined.

The three-dimensional power meter of the foregoing embodiments is drawn to be the first meter image 131 and the second meter image 132 on the cylindrical surfaces of cylinders, but alternatively the three-dimensional power meter 130 may be drawn on a square cylindrical surface of a or drawn on a curved surface other than the cylindrical surface. The same effects and advantages as the foregoing embodiments can be obtained by arranging at least the first meter image 131 that moves the movable needle 137 (first indicating part) while fixing the motor output gauge 133 (the first scale displaying part) and the second meter image that rotates the movable gauge 138 (second scale displaying part) while fixing the fixed needle 139 (second indicating unit) adjacently.

3. Appendix

In relation to the foregoing embodiments including the modifications thereof, the following appendices will now be disclosed.

Appendices 1-7: Method for Displaying

Appendix 1

A method for displaying information of a plurality of variables that reflect a state of a vehicle on a display, the method comprising:

displaying a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part;

displaying a second meter image including a second scale displaying part that displays a scale of a second variable included in the plurality of variables and a displaying part that displays the second variable that varies with the state of the vehicle; and displaying the first meter image and the second meter image to be adjacent to each other.

Appendix 2

The method according to appendix 1, wherein the indicating part is a reference point of the displaying part in the second meter image.

Appendix 3

The method according to appendix 1 or 2, wherein the indicating part are displayed at a center in an up-down direction of the first meter image and the second meter image.

Appendix 4

The method according to one of appendices 1-3, wherein the display part is an image in a band shape.

Appendix 5

The method according to one of appendices 1-4, wherein the first meter image and the second meter image are integrally drawn into a cylindrical form.

Appendix 6

The method according to one of appendices 1-5, wherein:
the vehicle comprises a motor and an engine for running the vehicle;
the first variable includes a parameter representing an engine speed of the engine; and
the second variable includes a parameter representing an output of the motor.

Appendix 7

The method according to one of appendices 1-6, wherein:
the second meter image comprises:
a first region representing a magnitude of regeneration electric power of a motor, and
a second region being disposed adjacently to a side of a higher output of the first region and representing an output range when the motor is powered-running; and
the second region is provided with a third region being disposed on a side of a high output in the second region and indicating an output range in which an engine has a high possibility of being started.

Appendices 8-14: Display Device

Appendix 8

A display device that displays information of a plurality of variables that reflect a state of a vehicle, the display device comprising:
a first calculating unit that generates a first meter image including a first scale displaying part that displays a scale of a first variable included in the plurality of variables and an indicating part that indicates the first variable that varies with the state of the vehicle and rotating the first scale displaying part in accordance with variation of the first variable;
a second calculating unit that generates a second meter image including a second scale displaying part that displays a scale of a second variable included in the plurality of variables and a displaying part that displays the second variable that varies with the state of the vehicle; and
a drawing unit that draws the first meter image and the second meter image to be adjacent to each other.

Appendix 9

The display device according to appendix 8, wherein the indicating part is a reference point of the displaying part in the second meter image.

Appendix 10

The display device according to appendix 8 or 9, wherein the indicating part are displayed at a center in an up-down direction of the first meter image and the second meter image.

Appendix 11

The display device according to one of appendices 8-10, wherein the display part is an image in a band shape.

Appendix 12

The display device according to one of appendices 8-11, wherein the first meter image and the second meter image are integrally drawn into a cylindrical form.

Appendix 13

The display device according to one of appendices 8-12, wherein: the vehicle comprises a motor and an engine for running the vehicle;
the first variable includes a parameter representing an engine speed of the engine; and
the second variable includes a parameter representing an output of the motor.

Appendix 14

The display device according to one of appendices 8-13, wherein:
the second meter image comprises:
a first region representing a magnitude of regeneration electric power of the motor, and
a second region being disposed adjacently to a side of a higher output of the first region and representing an output range when the motor is powered-running; and
the second region is provided with a third region being disposed on a side of a high output in the second region and indicating an output range in which the engine has a high possibility of being started.

Appendices 15-21: Program

Appendix 15

A program for displaying information of a plurality of variables that reflect a state of a vehicle on a display, the program comprising:
displaying a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part;
displaying a second meter image that comprises a second scale displaying part that displays a scale of a second variable included in the plurality of variables and a displaying part that displays the second variable that varies with the state of the vehicle; and displaying the first meter image and the second meter image to be adjacent to each other.

Appendix 16

The program according to appendix 15, wherein the indicating part is a reference point of the displaying part in the second meter image.

Appendix 17

The program according to appendix 15 or 16, wherein the indicating part are displayed at a center in an up-down direction of the first meter image and the second meter image.

Appendix 18

The program according to one of appendices 15-17, wherein the display part is an image in a band shape.

Appendix 19

The program according to one of appendices 15-18, wherein the first meter image and the second meter image are integrally drawn into a cylindrical form.

Appendix 20

The program according to one of appendices 15-19, wherein:
the vehicle comprises a motor and an engine for running the vehicle;
the first variable includes a parameter representing an engine speed of the engine; and
the second variable includes a parameter representing an output of the motor.

Appendix 21

The program according to one of appendices 15-20, wherein:
the second meter image comprises:
a first region representing a magnitude of regeneration electric power of the motor, and
a second region being disposed adjacently to a side of a higher output of the first region and representing an output range when the motor is powered-running; and
the second region is provided with a third region being disposed on a side of a high output in the second region and indicating an output range in which the engine has a high possibility of being started.

Appendices 22-28: Recording Medium

Appendix 22

A recording medium (or a program module) having stored therein a program for displaying information of a plurality of variables that reflect a state of a vehicle on a display, the program comprising:
displaying a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part;
displaying a second meter image including a second scale displaying part that displays a scale of a second variable included in the plurality of variables and a displaying part that displays the second variable that varies with the state of the vehicle; and
displaying the first meter image and the second meter image to be adjacent to each other.

Appendix 23

The recording medium (or a program module) according to appendix 22, wherein the indicating part is a reference point of the displaying part in the second meter image.

Appendix 24

The recording medium (or a program module) according to appendix 22 or 23, wherein the indicating part are displayed at a center in an up-down direction of the first meter image and the second meter image.

Appendix 25

The recording medium (or a program module) according to one of appendices 22-24, wherein the display part is an image in a band shape.

Appendix 26

The recording medium (or a program module) according to one of appendices 22-25, wherein the first meter image and the second meter image are integrally drawn into a cylindrical form.

Appendix 27

The recording medium (or a program module) according to one of appendices 22-25, wherein:
the vehicle comprises a motor and an engine for running the vehicle;
the first variable includes a parameter representing an engine speed of the engine; and
the second variable includes a parameter representing an output of the motor.

Appendix 28

The recording medium (or a program module) according to one of appendices 22-26, wherein:
the second meter image comprises:
a first region representing a magnitude of regeneration electric power of a motor, and
a second region being disposed adjacently to a side of a higher output of the first region and representing an output range when the motor is powered-running; and
the second region is provided with a third region being disposed on a side of a high output in the second region and indicating an output range in which the engine has a high possibility of being started.

INDUSTRIAL APPLICABILITY

The present disclosure is preferably used as a display device for a hybrid vehicle including a motor and an engine.

The present disclosure is also applicable as a display device to an engine vehicle including only an engine.

REFERENCE 10 hybrid vehicle
11 motor
12 engine
13 battery
14 vehicle speed sensor
15 accelerator opening sensor
20 ECU
30 displaying system
40 first displaying device
41 first meter image
42 first scale displaying part
43 indicating part
44 second meter image
45 second scale displaying part
46 displaying part
47 first region
48 second region
49 third region
101 display
102 engine
103 running-purpose motor
104 running-purpose battery
105 PHEV-ECU
106 battery ECU
107 navigation ECU
108 gateway
109 vehicle
110 display ECU
111 first calculating unit
112 second calculating unit
113 drawing unit
120 power meter
121 motor or running-purpose battery output gauge
122 engine speed gauge
123 regeneration region
124 powered running region
125 engine combined-use region
126 first movable needle
126A third movable needle
127 speed meter
128 vehicle speed gauge
129 second movable needle
130 three-dimensional power meter
131 first meter image
132 second meter image
133 motor or running-purpose battery output gage (first scale displaying part)
134 regeneration region (first region)
135 powered running region (second region)
136 engine combined-use region (third region)
137 movable needle (first indicating part)
138 movable gauge (second scale displaying part)
139 fixed needle (second indicating part)
140 three-dimensional speed meter
141 vehicle speed movable gauge
142 second fixed needle
143 navigation screen
144 top face

The invention claimed is:

1. A display device that displays information of a plurality of variables that reflect a state of a vehicle, the display device comprising:

a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part; and a second meter image including a second scale displaying part that displays a scale of a second variable included in the plurality of variables and a displaying part that displays the second variable that varies with the state of the vehicle by means of an image in a band shape, wherein the first meter image and the second meter image are adjacent to each other, the indicating part is a reference point of the displaying part in the second meter image, and a length of the band shape varies according to the magnitude of the second variable by use of the indicating part as the reference point.

2. The display device according to claim 1, wherein the indicating part are displayed at a center in an up-down direction of the first meter image and the second meter image.

3. The display device according to claim 1, wherein the first meter image and the second meter image are integrally drawn into a cylindrical form.

4. The display device according to claim 1, wherein:

the vehicle mounts thereon an electric motor and an internal combustion engine;

the second variable indicates a first output of the vehicle in a first mode that antecedents running with the electric motor, stopping the internal combustion engine; and the first variable indicates a second output of the vehicle in a second mode that runs the vehicle, activating the internal combustion engine.

5. The display device according to claim 4, wherein:

the second variable indicates a third output of the vehicle in the second mode; and the third output is different from the second output.

6. The display device according to claim 4, wherein:

the first variable includes a parameter representing an output of the internal combustion engine; and the second variable includes a parameter representing an output of the electric motor.

7. A display device that displays information of a plurality of variables that reflect a state of a vehicle, the display device comprising:

a first meter image including a first scale displaying part that displays a scale of a first variable included in the plurality of variables and an indicating part that indicates the first variable that varies with the state of the vehicle and rotating the first scale displaying part in accordance with variation of the first variable, fixing the position of the indicating part; and a second meter image including a second scale displaying part that displays a scale of a second variable included in the plurality of variables and a displaying part that displays the second variable that varies with the state of the vehicle, wherein the first meter image and the second meter image are adjacent to each other;

the vehicle mounts thereon an electric motor and an internal combustion engine;

the second variable indicates a first output of the vehicle in a first mode that antecedents running with the electric motor, stopping the internal combustion engine;

the first variable indicates a second output of the vehicle in a second mode that runs the vehicle, activating the internal combustion engine, and the second meter image comprises:
  a first region representing a magnitude of regeneration electric power of the electric motor, and
  a second region being disposed adjacently to a side of a higher output of the first region and representing an output range when the electric motor is powered running; and the second region is provided with a third region being disposed on a side of a high output in the second region and indicating an output range in which the internal combustion engine has a high possibility of being started.

* * * * *